US010755122B2

(12) United States Patent
Ali et al.

(10) Patent No.: US 10,755,122 B2
(45) Date of Patent: Aug. 25, 2020

(54) ENHANCED VEHICLE MONITORING

(71) Applicant: International Business Machines Corporation, Armonk, NY (US)

(72) Inventors: Asmahan A. Ali, Highland, NY (US); Ali Y. Duale, Poughkeepsie, NY (US); Mustafa Y. Mah, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 15/835,990

(22) Filed: Dec. 8, 2017

(65) Prior Publication Data
US 2018/0197029 A1 Jul. 12, 2018

Related U.S. Application Data

(63) Continuation of application No. 15/399,862, filed on Jan. 6, 2017.

(51) Int. Cl.
*G06K 9/00* (2006.01)
*G06K 9/20* (2006.01)
(Continued)

(52) U.S. Cl.
CPC ......... *G06K 9/00832* (2013.01); *B60W 40/08* (2013.01); *B60W 50/14* (2013.01); *E05F 15/73* (2015.01); *E05F 15/74* (2015.01); *E05F 15/77* (2015.01); *F02D 41/042* (2013.01); *F02D 41/26* (2013.01); *G06K 9/00979* (2013.01); *G06K 9/209* (2013.01); *G06K 9/22* (2013.01); *G06K 9/6201* (2013.01); *G08B 13/19602* (2013.01); *G08B 13/19613* (2013.01); *G08B 21/24* (2013.01); *G08B 25/08* (2013.01); *G08G 1/04* (2013.01); *B60W 2040/0881* (2013.01); *B60W 2050/143* (2013.01); *E05F 15/71* (2015.01);
(Continued)

(58) Field of Classification Search
None
See application file for complete search history.

(56) References Cited

U.S. PATENT DOCUMENTS 6,757,009 B1 * 6/2004 Simon .................... B60N 2/002
  348/148
8,044,782 B2 * 10/2011 Saban .................... B60N 2/002
  340/438

(Continued)

OTHER PUBLICATIONS

RD606018A, Oct. 2014, Annonomous.*

(Continued)

*Primary Examiner* — David P. Merlino
(74) *Attorney, Agent, or Firm* — William H. Hartwell

(57) ABSTRACT

A method for an enhanced vehicle monitoring system that utilizes cameras and other sensors to determine the state of the interior and/or exterior of a vehicle is provided. The method comprises detecting that a driver has exited a vehicle. The method further comprises monitoring a state of the vehicle. The method further comprises determining based, at least in part, on the monitoring, if an object has been left in the vehicle unintentionally or if the vehicle has been left running unattended. The method further comprises, upon determining that the object has been left in the vehicle or the vehicle has been left running unattended, sending a notification to the driver.

1 Claim, 10 Drawing Sheets

(51) Int. Cl.

| | |
|---|---|
| *G08G 1/04* | (2006.01) |
| *F02D 41/26* | (2006.01) |
| *F02D 41/04* | (2006.01) |
| *E05F 15/73* | (2015.01) |
| *B60W 40/08* | (2012.01) |
| *B60W 50/14* | (2020.01) |
| *G06K 9/22* | (2006.01) |
| *G06K 9/62* | (2006.01) |
| *E05F 15/77* | (2015.01) |
| *G08B 13/196* | (2006.01) |
| *E05F 15/74* | (2015.01) |
| *G08B 21/24* | (2006.01) |
| *G08B 25/08* | (2006.01) |
| *E05F 15/71* | (2015.01) |
| *F02D 41/02* | (2006.01) |
| *F02D 17/04* | (2006.01) |

(52) U.S. Cl.
CPC ........ *E05F 2015/767* (2015.01); *F02D 17/04* (2013.01); *F02D 41/021* (2013.01); *F02D 2200/60* (2013.01); *F02D 2200/70* (2013.01); *G06K 9/00288* (2013.01); *G06K 9/00805* (2013.01); *G06K 2009/00738* (2013.01)

(56) References Cited

U.S. PATENT DOCUMENTS

| | | | | |
|---|---|---|---|---|
| 10,115,029 | B1* | 10/2018 | Day | ................ G06K 9/00832 |
| 2004/0000989 | A1 | 1/2004 | Davis | |
| 2013/0049946 | A1 | 2/2013 | Chavez | |
| 2014/0184404 | A1 | 7/2014 | Schoenberg et al. | |
| 2014/0184428 | A1 | 7/2014 | Healey | |
| 2014/0214499 | A1 | 7/2014 | Hudson | |
| 2014/0343788 | A1 | 11/2014 | Hosey et al. | |
| 2015/0137985 | A1 | 5/2015 | Zafiroglu | |
| 2015/0184442 | A1 | 7/2015 | Gantman et al. | |
| 2015/0206014 | A1 | 7/2015 | Wu | |
| 2015/0269745 | A1* | 9/2015 | Klimer | ................ G06T 7/194 |
| | | | | 382/103 |
| 2016/0086391 | A1 | 3/2016 | Ricci | |
| 2016/0096412 | A1 | 4/2016 | Mankame et al. | |
| 2017/0147887 | A1* | 5/2017 | Be | ................ B60Q 9/002 |
| 2017/0148235 | A1 | 5/2017 | Yakub et al. | |
| 2017/0370732 | A1 | 12/2017 | Bender | |
| 2018/0118198 | A1 | 5/2018 | Yuan | |
| 2018/0322710 | A1 | 11/2018 | Hohenacker | |

OTHER PUBLICATIONS

McCoppin et al., "Poisoning death of Highland Park couple points to alarming trend", Chicago Tribune, Jun. 22, 2015, 11:51 AM, Three pages.

Rajesh et al., "Intelligent Vehicle Security and SOS Messaging System with Embedded GSM Module", International Journal of Advanced Research in Electrical, Electronics and Instrumentation Engineering (An ISO 3297: 2007 Certified Organization), vol. 4, Issue 6, Jun. 2015, pp. 5435-5439.

Ali et al., "Enhanced Vehicle Monitoring", U.S. Appl. No. 15/399,862, filed Jan. 6, 2017, 49 pages.

Ali et al., "Enhanced Vehicle Monitoring", U.S. Appl. No. 15/794,098, filed Oct. 26, 2017, 45 pages.

Mell et al., "The NIST Definition of Cloud Computing", Recommendations of the National Institute of Standards and Technology, Special Publication 800-145, Sep. 2011, 7 pages.

"Unoccupied Vehicle Running Alert", Research Disclosure, Disclosed anonymously, Research Disclosure database No. 606018, Published in the Oct. 2014 paper journal, Published digitally Sep. 9, 2014, 2 pages.

IBM, "List of IBM Patents or Patent Applications Treated as Related", Appendix P, 2 pages, dated Dec. 8, 2017.

* cited by examiner

ENHANCED VEHICLE MONITORING

BACKGROUND

The present invention relates generally to the field of communication systems, and more particularly to communication systems between vehicles and owners.

Computer vision is an interdisciplinary field that deals with how computers can be made to gain high-level understanding from digital images or videos. In general, computer vision seeks to automate tasks that the human visual system can perform. Computer vision tasks include methods for acquiring, processing, analyzing and understanding digital images, and in general, deal with the extraction of high-dimensional data from the real world in order to produce numerical or symbolic information. Image data can take many forms, such as still images, video sequences, views from multiple cameras, or multi-dimensional data from a medical scanner.

In the field of computer vision, object recognition is a technology for finding and identifying objects in an image or video sequence. Object detection can be a difficult endeavor, as objects in images may vary somewhat in different viewpoints, in different sizes and scales, or even when they are translated or rotated. In some object detection systems, objects can even be recognized when they are partially obstructed from view.

SUMMARY

Embodiments of the present invention disclose a method, computer program product, and system for an enhanced vehicle monitoring system that utilizes cameras and other sensors to determine the state of the interior and/or exterior of a vehicle. The method comprises detecting that a driver has exited a vehicle. The method further comprises monitoring a state of the vehicle. The method further comprises determining based, at least in part, on the monitoring, if an object has been left in the vehicle unintentionally or if the vehicle has been left running unattended. The method further comprises, upon determining that the object has been left in the vehicle or the vehicle has been left running unattended, sending a notification to the driver.

DETAILED DESCRIPTION

Figure 1:
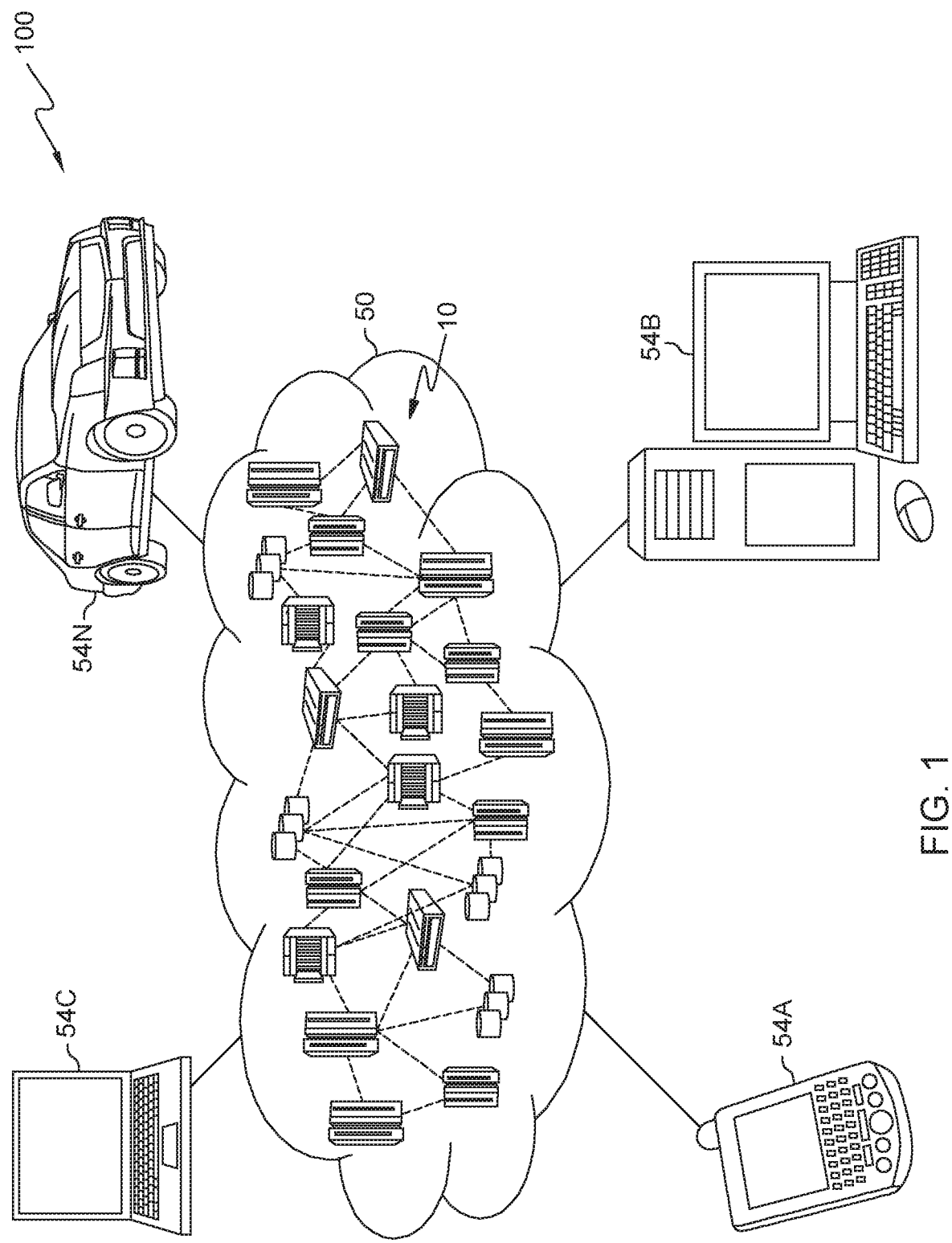
FIG. 1 is a functional block diagram depicting a cloud computing environment according to an embodiment of the present invention.

Existing vehicle monitoring systems typically include alarms, global positioning system (GPS) tracking devices, and/or sensors related to vehicle maintenance. While beneficial, these existing systems are traditionally directed to monitoring specific vehicle characteristics, and are not equipped to determine the general state of the interior and/or exterior of a vehicle (for example, items contained within the vehicle, individuals entering/exiting the vehicle, and/or items immediately surrounding the vehicle). Embodiments of the present invention include an enhanced vehicle monitoring system that utilizes cameras and other sensors to determine the state of the interior and/or exterior of a vehicle. Upon determining this state information, embodiments of the present invention can then use the state information to provide machine-logic based alerts and recommendations to the owner or driver of the vehicle.

Embodiments in accordance with the present invention will now be described in detail with reference to the Figures.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
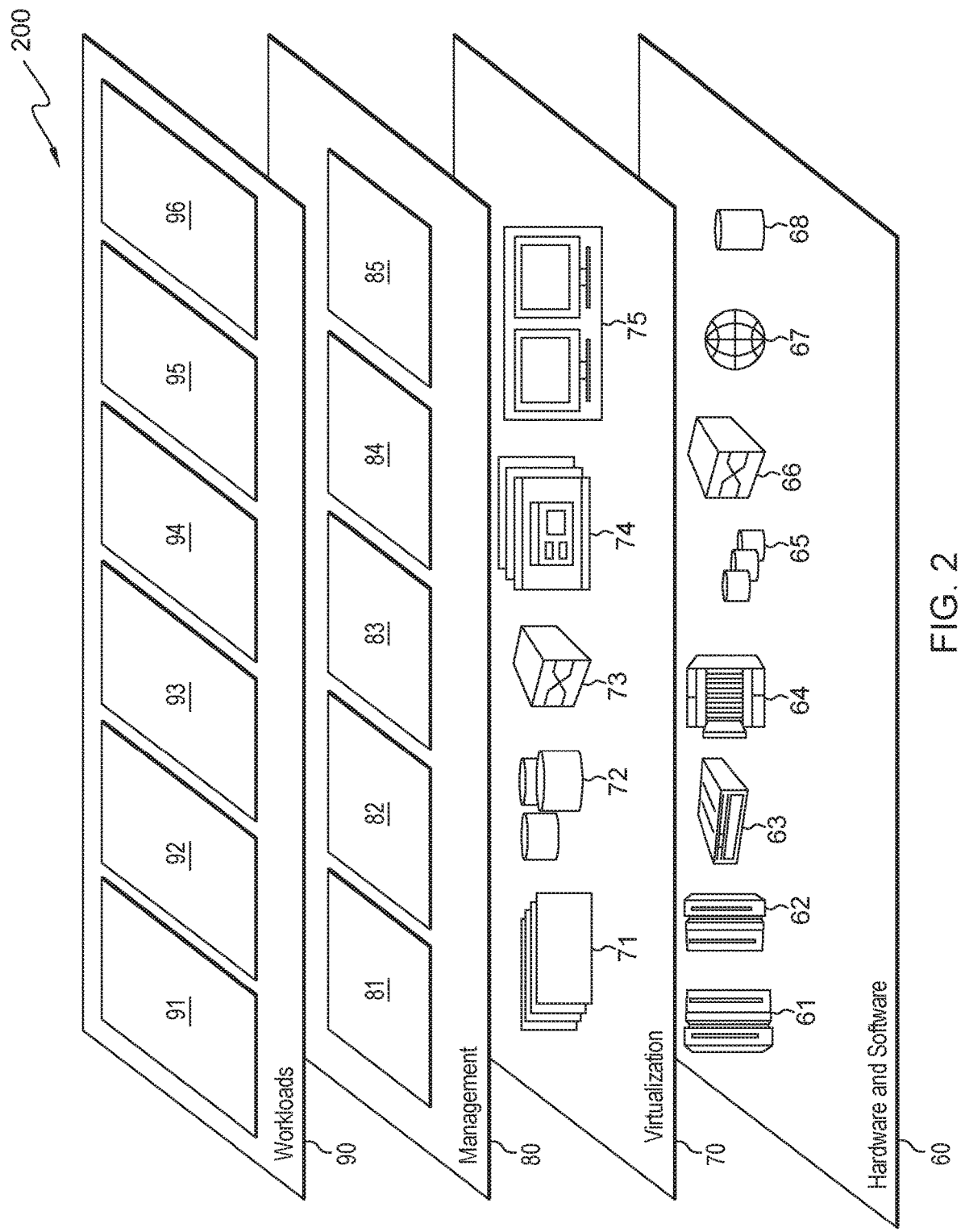
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and monitor software 96.

Figure 3:
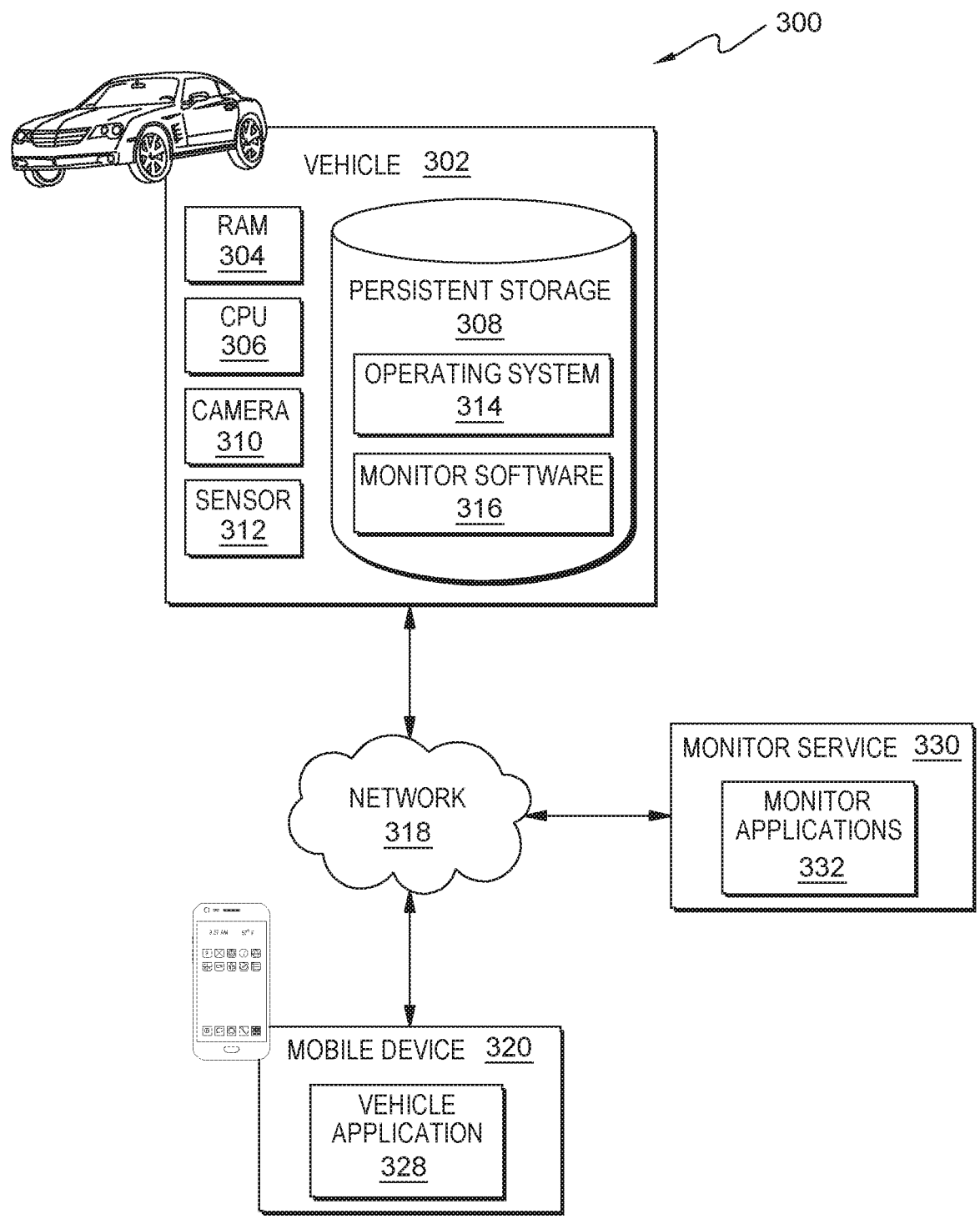
FIG. 3 is a functional block diagram illustrating a vehicle communication environment, in an embodiment in accordance with the present invention.

FIG. 3 is a functional block diagram, generally designated 300, illustrating a vehicle communication environment, in an embodiment in accordance with the present invention.

Vehicle communication environment 300 includes vehicle 302, mobile device 320, monitor service 330, and other computing devices (not shown), all interconnected over network 318. Vehicle 302 includes random access memory (RAM) 304, central processing unit (CPU) 306, persistent storage 308, camera 310, and sensor 312. Vehicle 302 may contain a Web server, or any other electronic device or computing system, capable of processing program instructions and receiving and sending data. In some embodiments, components of vehicle 302 may include a laptop computer, a tablet computer, a netbook computer, a personal computer (PC), a desktop computer, a personal digital assistant (PDA), a smart phone, or any programmable electronic device capable of communicating over a data connection to network 318. In other embodiments, vehicle 302 may utilize multiple server computing systems comprised of multiple computers as a server system, such as in a distributed computing environment. In general, vehicle 302 is representative of any electronic device or combinations of electronic devices capable of executing machine-readable program instructions and communicating with mobile device 320 and monitor service 330 via network 318 and with various components and devices (not shown) within vehicle communication environment 300.

Vehicle 302 includes persistent storage 308. Persistent storage 308 may, for example, be a hard disk drive. Alternatively, or in addition to a magnetic hard disk drive, persistent storage 308 may include a solid state hard drive, a semiconductor storage device, read-only memory (ROM), erasable programmable read-only memory (EPROM), flash memory, or any other computer-readable storage medium that is capable of storing program instructions or digital information.

Monitor software 316 is a computer program, or set of computer programs, that is stored in persistent storage 308. Monitor software 316 enables a driver, also referred to as an owner, or a user, to receive detected events from vehicle 302. For example, monitor software 316 can scan the interior of vehicle 302, using computer vision or object recognition technology, to determine if the owner, or an authorized driver, forgot an item (e.g., a purse) when exiting vehicle 302. Monitor software 316 can also authenticate the driver upon entering. For example, when a driver enters vehicle 302, monitor software can capture and compare one or more images of the driver's face to one or more images of authorized operators of vehicle 302. In other example embodiments, monitor software 316 may be a component of operating system 314.

Operating system 314 is a computer program, or set of computer programs, that is stored in persistent storage 308. Operating system 314 enables monitor software 316 to communicate with mobile device 320, monitor service 330, and other computing devices (not shown) of vehicle communication environment 300 over a data connection on network 318.

Camera 310 is included in vehicle 302 to capture images of the inside and the surrounding area outside of vehicle 302 to determine, for example, if objects have been left unintentionally, or events occurring externally around vehicle 302 could cause harm to the driver or delays in the driver's schedule. For example, monitor software 316 can receive a weather alert for a possible snow storm and monitor the area around vehicle 302. Upon detecting that snow accumulations have reached a certain level, monitor software 316 can notify the owner of vehicle 302 to warn about the weather and extra time needed to travel. Camera 310 can also capture images of the driver's face to authenticate the driver using a list of facial images the owner of vehicle 302 provides. In other example embodiments, there can be more than one camera 310 within vehicle 302.

Sensor 312 is also included in vehicle 302 to detect conditions within the cabin and/or external to vehicle 302. In the example embodiment of FIG. 1, sensor 312 can: (i) detect motion inside and/or outside vehicle 302, (ii) detect acoustics, sounds and/or vibrations, (iii) detect thermal and/or heat temperatures, (iv) detect chemical or gas emissions, and (v) function as a proximity or presence sensor. For example, upon detecting that a passenger left a container of ice cream in the back seat of vehicle 302, using camera 310 and sensor 312, monitor software 316 can notify the driver and include the temperature inside vehicle 302 with the notification. In other example embodiments, there can be more than one sensor 312 within vehicle 302.

Figure 10:
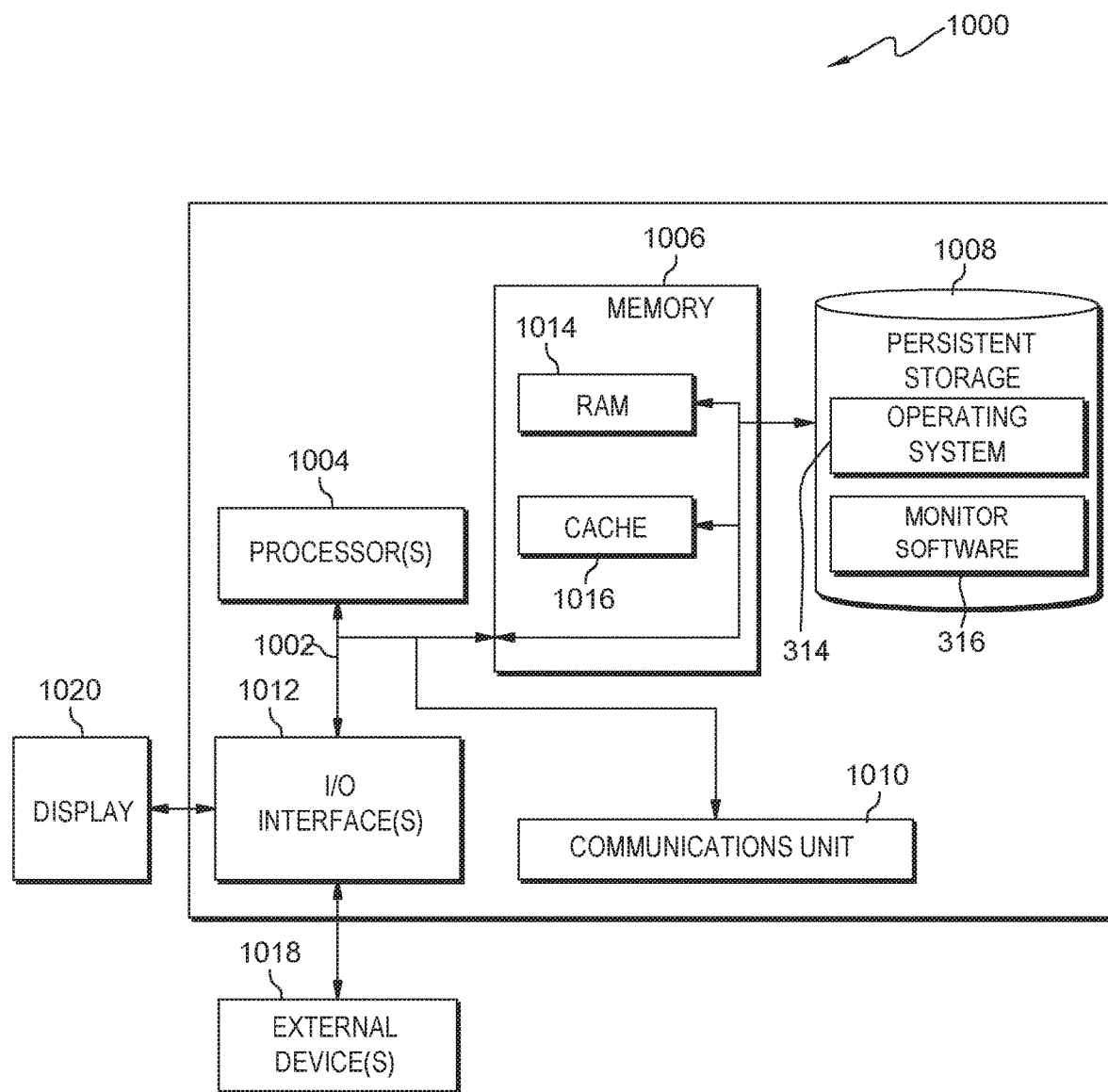
FIG. 10 depicts a block diagram of components of a vehicle executing monitor software, in an embodiment in accordance with the present invention.

Vehicle 302 may include internal and external hardware components, as depicted and described in further detail with respect to FIG. 10.

In FIG. 3, network 318 is shown as the interconnecting fabric between vehicle 302, mobile device 320, monitor service 330, and with various components and devices (not shown) within vehicle communication environment 300. In practice, the connection may be any viable data transport network, such as, for example, a LAN or WAN. Network 318 can be for example, a local area network (LAN), a wide area network (WAN) such as the Internet, or a combination of the two, and include wired, wireless, or fiber optic connections. In general, network 318 can be any combination of connections and protocols that will support communications between vehicle 302, mobile device 320, monitor service 330, and with various components and devices (not shown) within vehicle communication environment 300.

Mobile device 320 is included in vehicle communication environment 300. Mobile device 320 may be a Web server, or any other electronic device or computing system, capable of processing program instructions and receiving and sending data. In some embodiments, mobile device 320 may be a laptop computer, a tablet computer, a netbook computer, a personal computer (PC), a desktop computer, a personal digital assistant (PDA), a smart phone, or any programmable electronic device capable of communicating over a data connection to network 318. In other embodiments, mobile device 320 may represent server computing systems utilizing multiple computers as a server system, such as in a distributed computing environment. In general, mobile device 320 is representative of any electronic devices or combinations of electronic devices capable of executing machine-readable program instructions and communicating with vehicle 302, and monitor service 330 via network 318 and with various components and devices (not shown) within vehicle communication environment 300.

Mobile device 320 contains vehicle application 328 that enables a user of mobile device 320 to receive communications from monitor software 316 in vehicle 302, and from monitor applications 322 in monitor service 330. For example, vehicle application 328 can receive a communication, from monitor software 316 and/or monitor applications 332, that a driver left an object in the back seat upon exiting vehicle 302. Mobile device also contains operating system software (not shown), as well as software that enables mobile device 320 to detect and establish a connection to vehicle 302, and monitor service 330, and communicate with other computing devices (not shown) of vehicle communication environment 300 over a data connection on network 318.

Monitor service 330 is included in vehicle communication environment 300. In the example embodiment of FIG. 1, monitor service 330 can provide a subscription-based service, to an owner of vehicle 302, that can monitor the status of vehicle 302, authenticate one or more drivers, determine if the driver left any items behind after exiting vehicle 302, and/or detect changes in the environment around vehicle 302. For example, as part of a subscription service, monitor applications 332 can routinely monitor vehicle 302. For example, while getting ready for work, a driver remotely starts vehicle 302 but forgets to open the garage door. Upon detecting the engine starting in vehicle 302, monitor applications 332 detect that there is no driver and the garage door is closed. Monitor applications can then: (i) send the driver a text notification warning that the garage door is closed and the engine is running, (ii) turn off the engine, and/or (iii) activate a garage door remote function in vehicle 302 to open the closed garage door.

Figure 4:
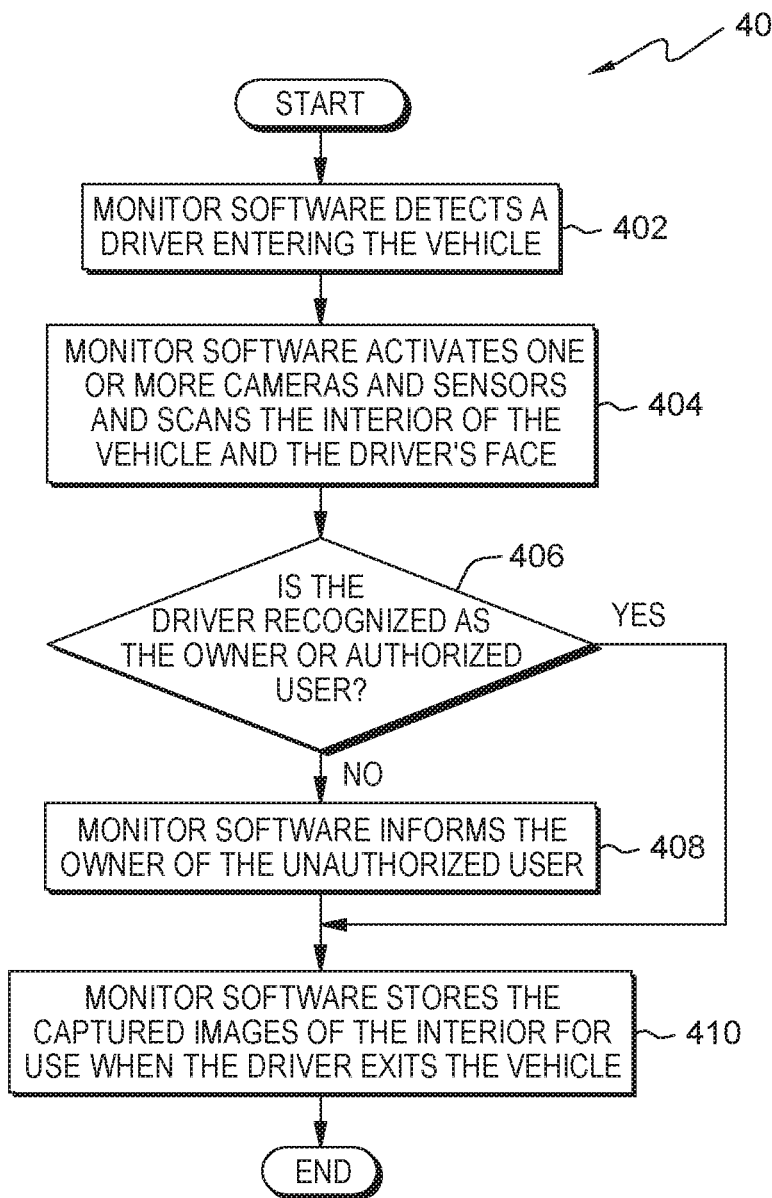
FIG. 4 is a flowchart depicting operational steps of a monitor software, on a computer within the data processing environment of FIG. 1, for scanning the inside of a vehicle prior to detecting a driver entering, and for authenticating the driver, in an embodiment in accordance with the present invention.
Figure 5A:
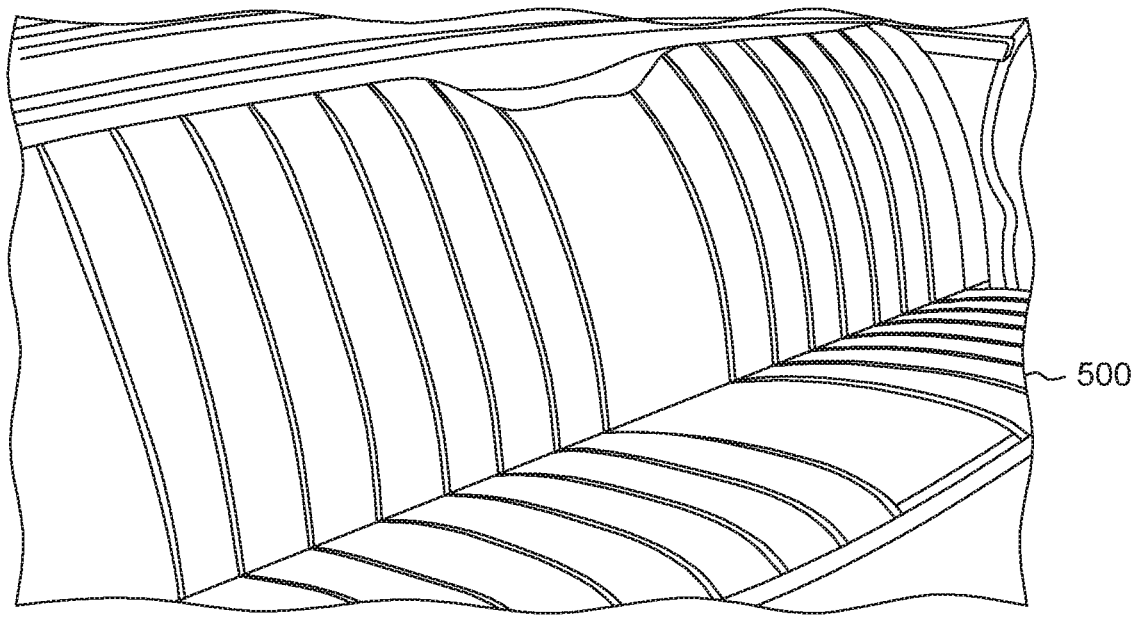
FIGS. 5A and 5B depict a forgotten purse left in a vehicle, in an embodiment in accordance with the present invention.
Figure 5B:
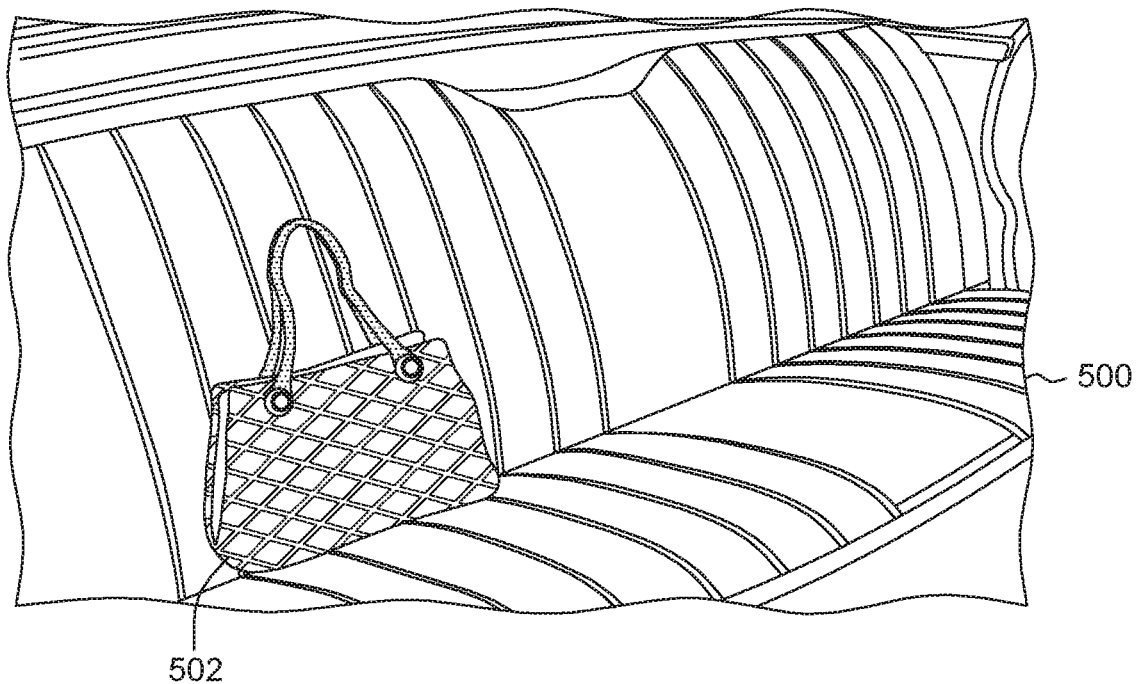
Figure 6:
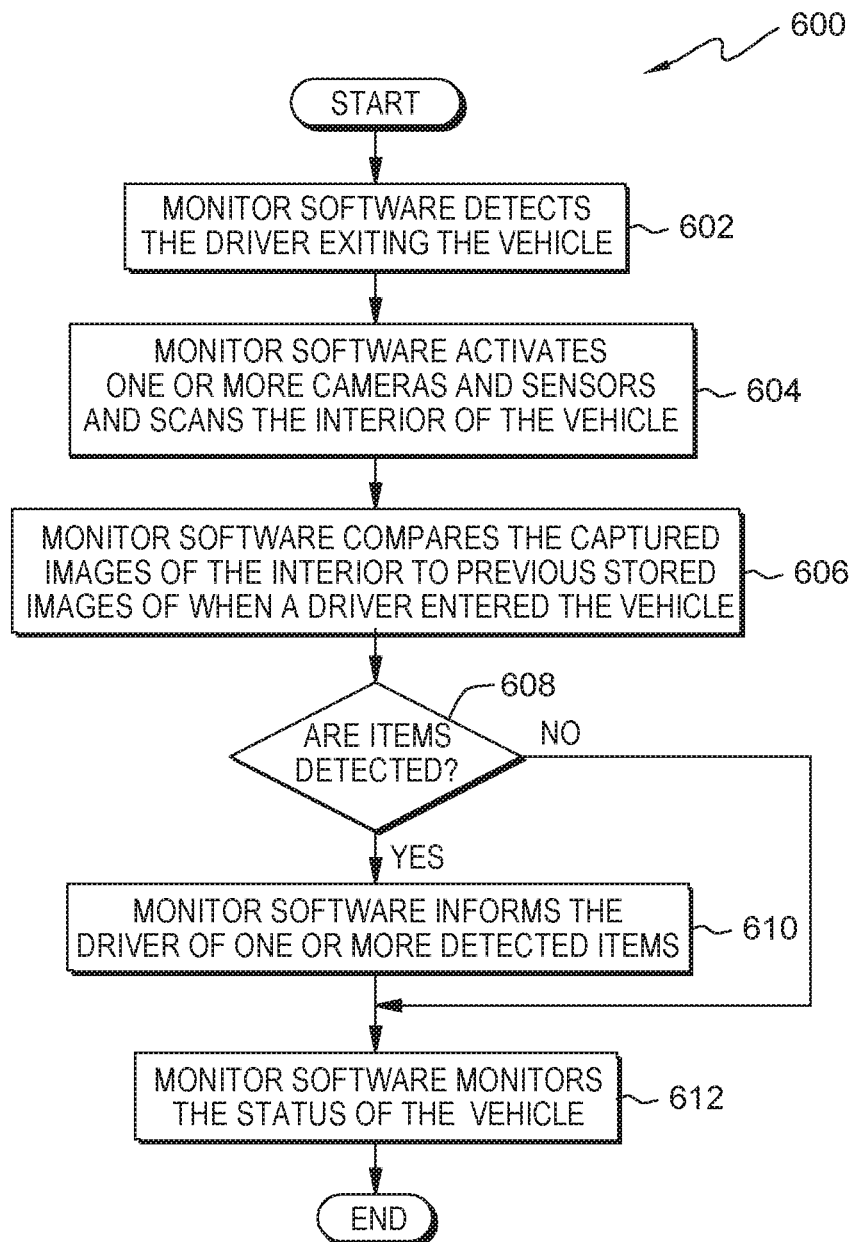
FIG. 6 is a flowchart depicting operational steps of a monitor software, on a computer within the data processing environment of FIG. 1, for scanning the inside of a vehicle, upon detecting a driver exiting, and determining if the driver misplaced any items, in an embodiment in accordance with the present invention.

FIG. 4 is a flowchart, generally designated 400, depicting operational steps of a monitor software, on a computer within the data processing environment of FIG. 1, for scanning the inside of a vehicle prior to detecting a driver entering, and for authenticating the driver, in an embodiment in accordance with the present invention. FIGS. 5A and 5B depict a forgotten purse left in the vehicle. FIG. 6 is a flowchart, generally designated 600, depicting operational steps of the monitor software, on the computer within the data processing environment of FIG. 1, for scanning the inside of the vehicle, upon detecting the driver exiting, and determining if the driver misplaced any items, in an embodiment in accordance with the present invention. The flowcharts and the associated depictions of the purse left in the vehicle will now be discussed over the course of the following paragraphs.

In one example embodiment, monitor software 316 detects a driver is about to enter vehicle 302 as depicted in step 402. For example, monitor software 316 can detect that the driver remotely unlocked the doors of vehicle 302 using a remote control or keyless entry feature. In another example embodiment, monitor software can detect a driver entering vehicle 302 by the activation of the door latch mechanism, or one or more door, floor, or seat-mounted sensors.

In step 404, monitor software 316 activates one or more cameras and sensors and scans the interior of vehicle 302 and the driver's face. For example, monitor software 316 can activate camera 310 and sensor 312 to capture one or more images of the interior of vehicle 302. One or more cameras 310 can capture images of the front seat (not shown), and back seat 500 (e.g., FIG. 5A), the floor areas, and the cargo area in the rear of vehicle 302. Upon detecting that the driver is sitting in the driver's seat, monitor software 316 can instruct the driver to look at the rear view mirror, where a camera can capture an image of the driver's face. In other example embodiments, monitor service 330 can direct the functions of step 404.

In decision step 406, monitor software 316 determines if the driver is recognized as the owner of vehicle 302. For example, monitor software 316 and/or monitor applications 332 compare a captured image of the driver to one or more stored images of the owner of vehicle 302. In other example embodiments, the one or more stored images can include images of other authorized operators of vehicle 302. If monitor software 316 determines that the image of the driver is not recognized as the owner of vehicle 302 ("No" branch, decision 406), monitor software 316 can inform the owner of vehicle 302 of the unauthorized driver as depicted in step 408. In other example embodiments, monitor software can inform monitor service 330, using monitor applications 332, of the unauthorized driver and monitor service 330 can take appropriate actions. In other example embodiments, monitor software 316 can use a voice identification of the driver in addition to the facial recognition when authenticating a driver.

If monitor software 316 determines that the image of the driver is recognized as the owner of vehicle 302 ("Yes" branch, decision 406), or once monitor software 316 informs the owner of vehicle 302 of the unauthorized driver (step 408), monitor software 316 stores the captured images (e.g., back seat 500 as depicted in FIG. 5A) of the interior for use at a later time when the driver exits vehicle 302 as depicted in step 410. In other example embodiments, the captured images can be stored in persistent storage 308 of vehicle 302, or at monitor service 330.

Referring now to FIG. 6, monitor software 316 detects that a driver has exited vehicle 302 as depicted in step 602. For example, monitor software 316 can detect the driver has exited based on one or more of the following: (i) the engine has been turned off, (ii) the key has been removed from the ignition (if equipped), (iii) the door has been opened, and/or (iv) camera 310 and sensor 312 do not detect a person in the driver seat.

Monitor software 316 activates one or more cameras and sensors to scan the interior of vehicle 302 as depicted in in step 604. For example, monitor software 316 can activate camera 310 and sensor 312 to capture one or more images of the interior. One or more cameras 310 can capture images of the front seat (not shown), and back seat 500 (e.g., as depicted in FIG. 5B), the floor areas, and the cargo area in the rear. Monitor software 316 can use sensor 312 to determine the temperature of any detected objects, such as frozen foods. In other example embodiments, monitor service 330 can direct the functions of step 604.

In step 606, monitor software 316 compares the captured images of the interior to previously stored (i.e., previously captured), images of when a driver entered vehicle 302. For example, monitor software 316 compares the newly captured images (e.g., FIG. 5B), to the stored images in persistent storage 308 (e.g., FIG. 5A) to determine if anything was left by the driver. In other example embodiments, monitor service 330 is notified of the driver exiting and monitor applications 332 can compare the captured images of the interior to previously stored images of when a driver entered vehicle 302.

In decision step 608, monitor software determines if any objects are detected in vehicle 302. For example, using computer vision techniques, monitor software 316 can determine an object was left in back seat 500, as depicted in FIG. 5B, and recognize it as purse 502. In other example embodiments, monitor software 316 can use monitor applications 332 of monitor service 330 to determine the object. If monitor software 316 determines that one or more items are detected in vehicle 302 ("Yes" branch, decision 608), monitor software 316 informs the driver of the one or more detected items using vehicle application on mobile device 320 as depicted in step 610. For example, monitor software 316 can send the driver a text message of the detected item, where the text message includes the captured image of purse 502. In another example embodiment, monitor service 330, using monitor applications 332, can inform one or more operators of vehicle 302 of forgotten purse 502 by accessing a list of registered users provided by the owner of vehicle 302. Monitor applications 332 can send notifications in the form of a text message, including the image of purse 502, or a voicemail message identifying purse 502 in back seat 500.

If monitor software 316 determines that no items are detected in vehicle 302 ("No" branch, decision 608), or once monitor software informs the driver of one or more detected items, as depicted in step 610, monitor software 316 continues to monitor the status of the inside and surrounding area of vehicle 302 as depicted in step 612. For example, upon determining that the driver did not forget anything when exiting vehicle 302, monitor software 316 can monitor the inside of vehicle 302. For example, monitor software 316 can periodically check the temperature inside the cabin. If the temperature rises above a certain level, (e.g., an unsafe level), monitor software 316 can open one or more windows to lower the temperature inside the cabin. If it begins to rain, monitor software 316 can close one or more windows to prevent rain from getting inside vehicle 302. In another example embodiment, monitor software 316 can detect if an operator of an adjacent vehicle opens a door into the side of vehicle 302. Monitor software can capture one or more images of vehicles pulling into adjacent parking spaces, where the one or more images can include pictures and/or video of the vehicle license plate and the driver.

Figure 7:
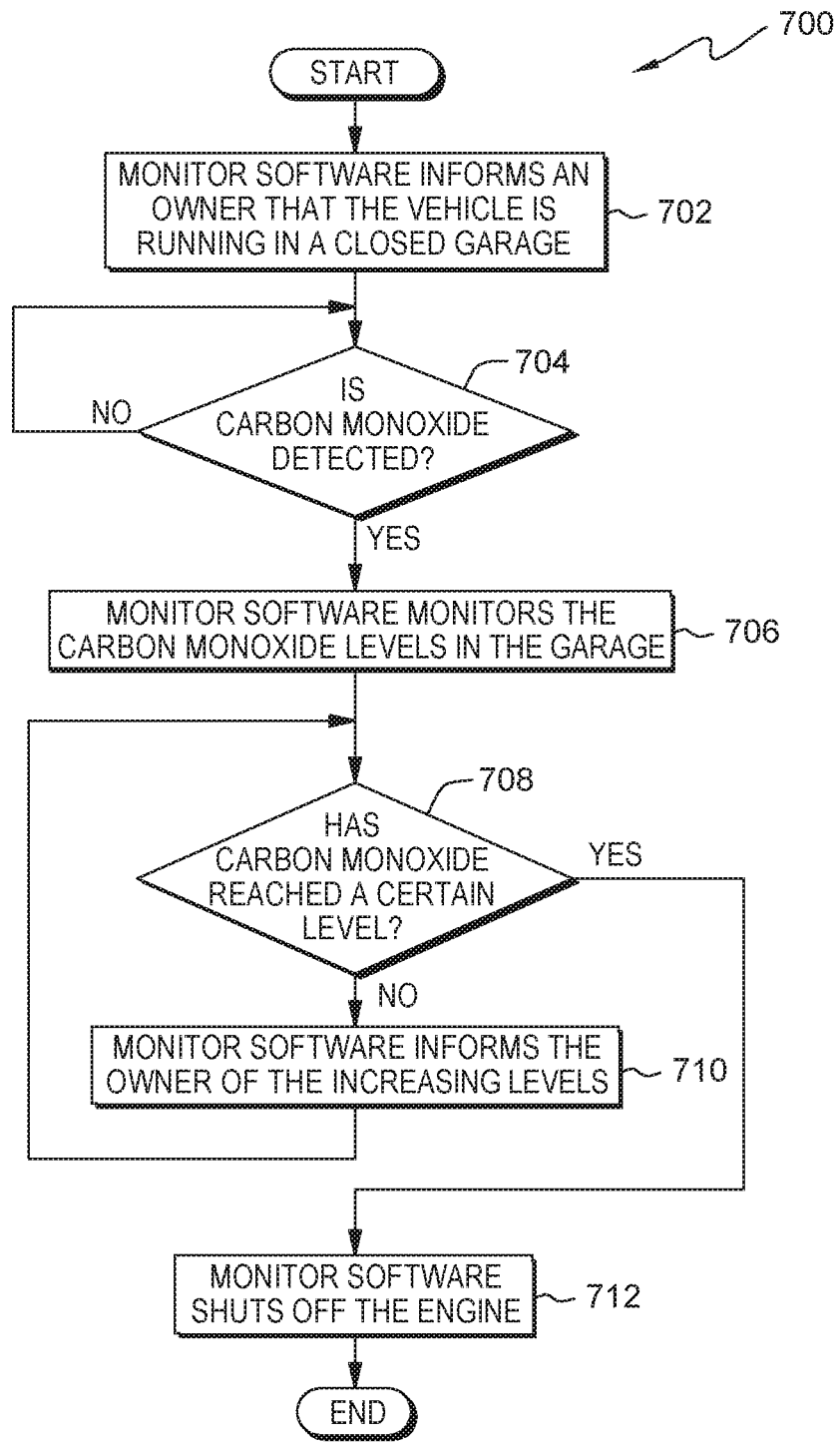
FIG. 7 is a flowchart depicting operational steps of a monitor software, on a computer within the data processing environment of FIG. 1, for detecting a vehicle was left running in a closed garage, in an embodiment in accordance with the present invention.

FIG. 7 is a flowchart, generally designated 700, depicting operational steps of a monitor software, on a computer within the data processing environment of FIG. 1, for detecting a vehicle was left running in a closed garage, in an embodiment in accordance with the present invention. In an example embodiment, an owner of vehicle 302 uses a remote feature to start the engine of vehicle 302 in the morning but forgets to open the garage door.

Monitor software 316 informs the owner of vehicle 302 that the engine is running and the garage door is closed as depicted in step 702. For example, upon detecting that the engine has been remotely started, monitor software 316 uses camera 310 and sensor 312 to determine the garage door is closed. Monitor software 316 then notifies the owner of vehicle 302 that the engine is running and the garage door is closed. In one example embodiment, monitor software 316 can include an image of the closed garage door.

In decision step 704, monitor software 316 determines if carbon monoxide is detected in the garage. For example, monitor software 316 can use sensor 312 to measure air quality inside the enclosed garage for a rising carbon monoxide level as vehicle 302 continues to run in the enclosed space. If monitor software 316 determines there is no detectable carbon monoxide level in the enclosed garage ("No" branch, decision 704), monitor software 316 continues to check for detectable carbon monoxide levels as depicted in FIG. 7. If monitor software 316 determines there is a detectable carbon monoxide level in the enclosed garage ("Yes" branch, decision 704), monitor software 316 monitors the carbon monoxide levels in the garage as depicted in step 706.

In step 706, monitor software 316 monitors the carbon monoxide levels in the garage. For example, monitor software 316 can use sensor 312 to measure the rising carbon monoxide level as vehicle 302 continues to run in the enclosed space. In another example embodiment, monitor software 316 can notify monitor service 330 to one or more emergency services of the situation.

In decision step 708, monitor software 316 determines if the carbon monoxide level have reached a certain level. For example, monitor software 316 uses sensor 312 to determine that the carbon monoxide level has reached a level that is dangerous or critical to humans. If monitor software 316 determines that the carbon monoxide level has not reached a level that is dangerous or critical to humans ("No" branch, decision 708), monitor software 316 informs the owner of the current, or increasing level of carbon monoxide as depicted in step 710. For example, monitor software 316 can send an email or text (SMS) message to inform of the situation and include a picture of the closed garage door and/or a graphic, such as a graph showing the measured increasing carbon monoxide levels. In another example embodiment, monitor software 316 or monitor applications 332 can call the owner of vehicle 302 and play an automated voice message to inform the owner of the situation and include a current measured level of carbon monoxide detected in the garage.

If monitor software 316 determines that the carbon monoxide level has reached a level that is dangerous or critical to humans ("Yes" branch, decision 708), monitor software 316 can turn off the engine as depicted in step 712. In another example embodiment, monitor software 316 can open the garage door using an automatic garage door feature of vehicle 302. In other example embodiments, monitor service 330 can detect the carbon monoxide levels and automatically open the garage door using monitor applications 332 to activate the automatic garage door feature of vehicle 302.

Figure 8A:
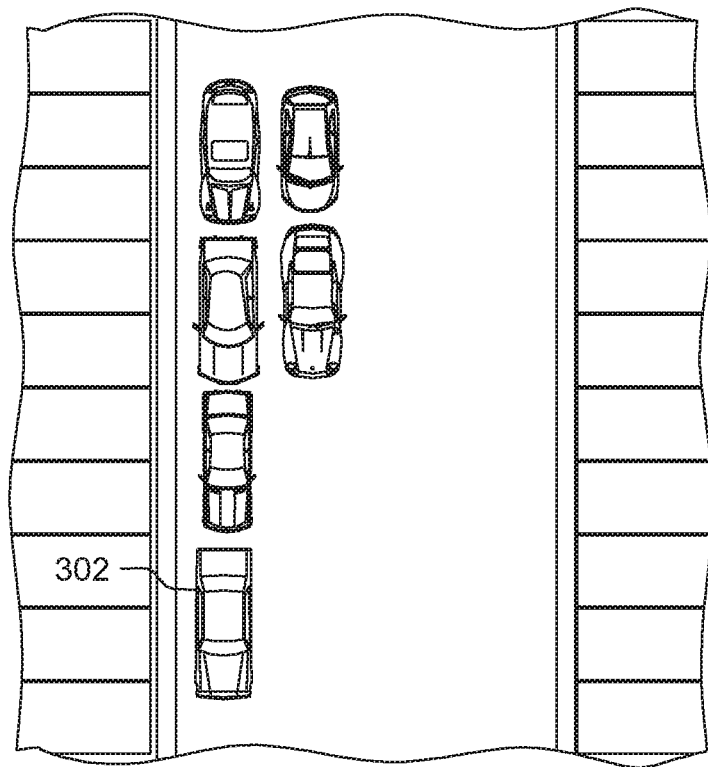
FIGS. 8A and 8B depict a vehicle being doubled parked, in an embodiment in accordance with the present invention.
Figure 8B:
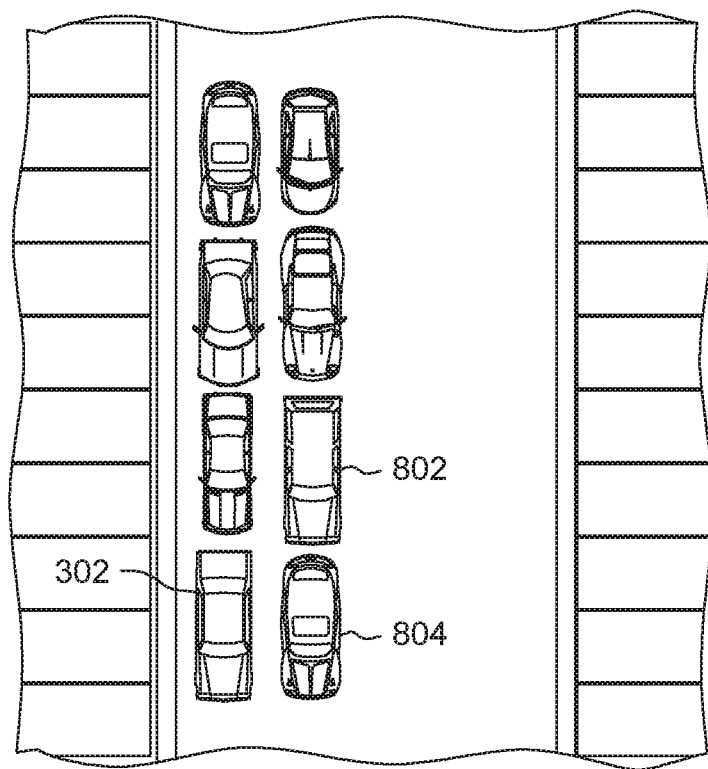
Figure 9:
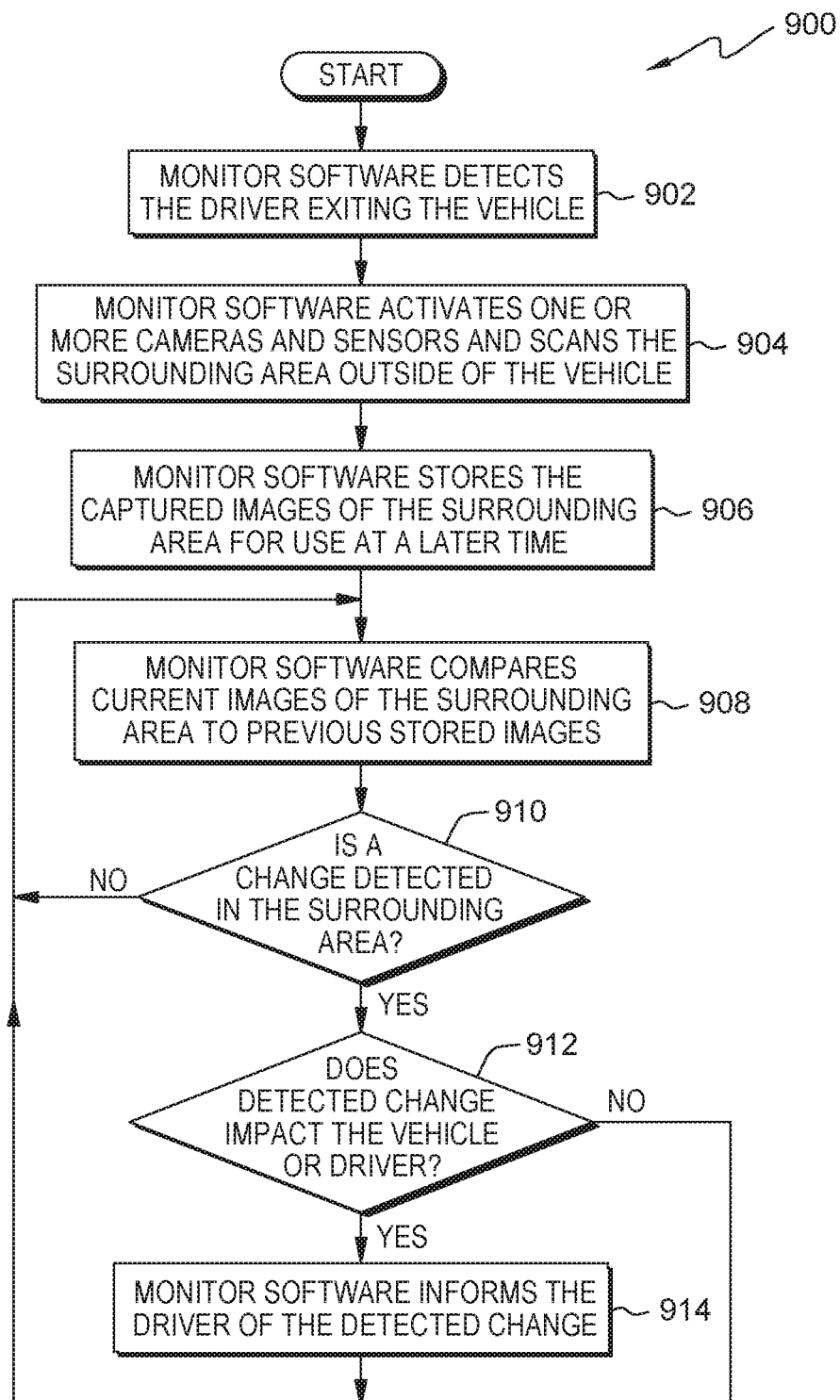
FIG. 9 is a flowchart depicting operational steps of a monitor software, on a computer within the data processing environment of FIG. 1, for monitoring the surrounding area outside a vehicle and reporting events to a driver of the vehicle, in an embodiment in accordance with the present invention.

FIG. 9 is a flowchart, generally designated 900, depicting operational steps of a monitor software, on a computer within the data processing environment of FIG. 1, for monitoring the surrounding area outside a vehicle and reporting events to a driver of the vehicle, in an embodiment in accordance with the present invention. FIGS. 8A and 8B depict a vehicle being doubled parked. The flowchart and the associated depictions of the vehicle being double parked will now be discussed over the course of the following paragraphs.

In an example embodiment, a driver parks vehicle 302 on a city street as depicted in FIG. 8A. Monitor software 316 then detects that the driver has exited vehicle 302 as depicted in step 902. For example, monitor software 316 detects the engine has been turned off, the door has been opened, and camera 310 no longer detects the driver sitting in the driver seat.

In step 904, monitor software 316 activates one or more cameras 310 and sensors 312 and scans the surrounding area outside of the vehicle. For example, monitor software 316 captures one or more images of the area surrounding vehicle 302. This can include one or more vehicles parked in front of, or behind, vehicle 302, and the areas to the left and right of vehicle 302. In other example embodiments, monitor service 330 can scan the surrounding area around vehicle 302 using monitor applications 332.

Monitor software 316 then stores the captured one or more images of the surrounding area for use at a later time as depicted in step 906. For example, monitor software 316 stores the captured one or more images of the surrounding area in persistent storage 308 to be used at a later time for detecting changes in the surrounding area. In other example embodiments, monitor software 316 can store the captured one or more images at monitor service 330.

In step 908, monitor software 316 compares current images of the surrounding area to previous stored images. For example, monitor software 316 can capture one or more images at determined intervals and compare them to the images of the surrounding area previously stored in persistent storage 308. In other example embodiments, monitor service 330 can capture one or more images at determined intervals and compare them to the images of the surrounding area previously stored when the driver exited vehicle 302.

In decision step 910, determines if a change is detected in the surrounding area. For example, while the driver is away from vehicle 302, vehicle s802 and 804 double park, blocking vehicle 302. Upon comparing images of the street-side view with previously stored images, monitor software 316 identifies vehicle 802 and 804 have double parked and now are preventing any exit for vehicle 302. If monitor software 316 determines that a change is not detected in the surrounding area ("No" branch, decision 910), monitor software 316 continues to monitor the surrounding area as depicted in step 908. In another example embodiment, monitor software 316 stores the current images of the surrounding area in persistent storage 308. For example, as time progresses, environmental factors, such as daylight, overcasting clouds, and/or rain, can cause current images of the surrounding area to vary drastically from the images that were first stored in persistent storage 308. To prevent monitor software 316 from falsely identifying, current images can be stored in persistent storage 308. In other example embodiments, monitor service 330 can capture and store images of the surrounding area using monitor applications 332.

If monitor software 316 determines that a change is detected in the surrounding area ("Yes" branch, decision 910), monitor software 316 determines is the detected change impacts vehicle 302 or the driver as depicted in decision step 912. For example, upon detecting vehicle 802 and 804 are double parked, monitor software 316 determines there is no access to the street, which can affect the travel plans of the driver of vehicle 302. In another example embodiment, monitor service 330 can access one or more camera 310, using monitor applications 332, to view vehicle 802 and 804. Monitor applications 332 can determine that there is no available exit route based on double parked vehicle 802 and 804. Monitor applications 332 can then inform the driver of vehicle 302 of the double parking situation to avoid the driver from being delayed upon returning to vehicle 302. In other example embodiments, where double parked vehicles 802 and 804 also incorporate monitor software 316 and/or monitor service 330, the owner of vehicle 302 can use vehicle application 328 to coordinate with the owners of double parked vehicle 802 and 804 on a time to move so that vehicle 302 can access the street.

In an alternate example embodiment, monitor software 316, when scanning the inside of vehicle 302 and detecting one or more objects, can determine if the one or more objects exceed certain dimensions on the seat or on the floor of vehicle 302. For example, upon detecting the one or more objects, monitor software 316 can access a calendar feature of mobile device 320 and determine the owner of vehicle 302 will be driving to an event at a later time with one or more passengers. The one or more objects (e.g., a large box that takes up the back seat area), will not allow the one or more children to sit in the back. Monitor software 316 can then notify the owner of vehicle 302 about the oversized one or more objects in the back seat, and remind the owner of vehicle 302 about the event at the later time that requires the back seat to be clear.

In yet another example alternate embodiment, monitor software 316 can use sensor 312 as a motion detection sensing device. For example, a perishable item, or a small pet, can enter, or be left, in vehicle 302. For example, a small pet can be under a seat and not visible during a scan by sensor 312. Upon the pet coming into view of sensor 312 at a later time, monitor software 316 can detect the movement and/or the body heat of the pet and inform the owner of vehicle 302. Monitor software 316 can also detect the temperature of inside vehicle 302 and open one or more windows to prevent the small pet from becoming over heated due to unsafe temperature levels.

In yet another example embodiment, monitor software 316 can provide the owner of vehicle 302 with reports of detected events in and around vehicle 302. For example, monitor software 316 can detect a person walking around the outside of vehicle 302 and looking into the windows. Monitor software 316 can capture one or more images and/or video of the person and send a report to vehicle application 328 on mobile device 320. In another example embodiment, monitor software 316 can notify monitor service 330 as well.

FIG. 10 depicts a block diagram, generally designated 1000, of components of a vehicle 302 executing the monitor software 316, in an embodiment in accordance with the present invention. It should be appreciated that FIG. 10 provides only an illustration of one implementation and does not imply any limitations with regard to the environments in which different embodiments may be implemented. Many modifications to the depicted environment may be made.

Vehicle 302 includes communications fabric 1002, which provides communications between computer processor(s) 1004, memory 1006, persistent storage 1008, communications unit 1010, and input/output (I/O) interface(s) 1012. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses.

Memory 1006 and persistent storage 1008 are computer readable storage media. In this embodiment, memory 1006 includes random access memory (RAM) 1014 and cache memory 1016. In general, memory 1006 can include any suitable volatile or non-volatile computer readable storage media.

Operating system 314 and monitor software 316 are stored in persistent storage 1008 for execution by one or more of the respective computer processors 1004 via one or more memories of memory 1006. In this embodiment, persistent storage 1008 includes a magnetic hard disk drive. Alternatively, or in addition to a magnetic hard disk drive, persistent storage 1008 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer readable storage medium that is also part of persistent storage 1008.

Communications unit 1010, in these examples, provides for communications with other data processing systems or devices, including resources of network 318, mobile device 320 and monitor service 330. In these examples, communications unit 1010 includes one or more network interface cards. Communications unit 1010 may provide communications through the use of either or both physical and wireless communications links. Operating system 314 and monitor software 316 may be downloaded to persistent storage 1008 through communications unit 1010.

I/O interface(s) 1012 allows for input and output of data with other devices that may be connected to vehicle 302. For example, I/O interface 1012 may provide a connection to external devices 1018 such as a keyboard, keypad, a touch screen, and/or some other suitable input device. External devices 1018 can also include portable computer readable storage media such as, for example, thumb drives, portable optical or magnetic disks, and memory cards. Software and data used to practice embodiments of the present invention, e.g., operating system 314 and monitor software 316, can be stored on such portable computer readable storage media and can be loaded onto persistent storage 1008 via I/O interface(s) 1012. I/O interface(s) 1012 also connect to a display 1020.

Display 1020 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

DEFINITIONS

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false. A "set of" items means there exists one or more items; there must exist at least one item, but there can also be two, three, or more items. A "subset of" items means there exists one or more items within a grouping of items that contain a common characteristic.

"Includes" and any variants (e.g., including, include, etc.) means, unless explicitly noted otherwise, "includes, but is not necessarily limited to."

A "user" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" acting as a single "user."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

What is claimed is:

1. A computer-implemented method comprising:

detecting, by one or more computer processors, that a driver has exited a vehicle;

monitoring, by the one or more computer processors, a state of the vehicle;

determining, by the one or more computer processors, based, at least in part on the monitoring, that one or more objects are located within a vehicle interior of the vehicle;

determining, by the one or more computer processors, by accessing a calendar feature, that the driver will be driving to an event at a later time with one or more passengers;

in response to determining that the driver will be driving to the event at the later time with the one or more passengers, determining, by the one or more computer processors, whether the one or more objects exceed certain dimensions on seats or a floor area of the vehicle interior;

upon determining that the one or more objects exceed the certain dimensions on the seats or the floor area of the vehicle interior, sending, by the one or more computer processors, a first notification to the driver, wherein the first notification indicates that the event at the later time requires the seats or the floor area to be clear for the one or more passengers;

determining, by the one or more computer processors, based, at least in part, on the monitoring, whether the vehicle has been left running unattended, wherein determining whether the vehicle has been left running unattended comprises:

detecting, by the one or more computer processors, that a vehicle engine of the vehicle is running, capturing, by the one or more computer processors, one or more images of a driver seat of the vehicle, and comparing, by the one or more computer processors, the one or more images of the driver seat to previously captured images of the driver seat when the driver is present;

upon determining that the vehicle has been left running unattended, sending a second notification, by the one or more computer processors, to the driver;

upon detecting that the driver has exited the vehicle, monitoring, by the one or more computer processors, an area around an exterior of the vehicle, wherein monitoring the area around the exterior of the vehicle comprises:

capturing, by the one or more computer processors, one or more images of the area around the exterior of the vehicle, and comparing, by the one or more computer processors, the captured one or more images of the area around the exterior of the vehicle to one or more previously captured images of the area around the exterior of the vehicle;

determining, by the one or more computer processors, that a second event has occurred in the area around the exterior of the vehicle based, at least in part, on the comparing of the captured one or more images of the area around the exterior of the vehicle to the one or more previously captured images of the area around the exterior of the vehicle, wherein the second event includes a second vehicle being double parked with the vehicle, and wherein determining that the second event has occurred includes determining that the vehicle has no available route to a street based on a location of the second vehicle with respect to the vehicle; and upon determining that the second event has occurred, sending a third notification, by the one or more computer processors, to the driver.

* * * * *